US008839444B2

(12) United States Patent
Roshchin (10) Patent No.: US 8,839,444 B2
(45) Date of Patent: Sep. 16, 2014

(54) AUTOMATIC ANALYSIS OF SOFTWARE LICENSE USAGE IN A COMPUTER NETWORK

(75) Inventor: Evgeny E. Roshchin, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 86 days.

(21) Appl. No.: 13/077,048

(22) Filed: Mar. 31, 2011

(65) Prior Publication Data

US 2012/0255025 A1 Oct. 4, 2012

(51) Int. Cl.
*G06F 21/00* (2013.01)
*G06F 21/10* (2013.01)
*G06F 21/12* (2013.01)

(52) U.S. Cl.
CPC ...... *G06F 21/105* (2013.01); *G06F 2221/0775* (2013.01); *G06F 21/121* (2013.01)
USPC .............................................. 726/26; 705/59

(58) Field of Classification Search
CPC .............................. G06F 21/105; G06F 21/121
USPC .......................................................... 726/31
See application file for complete search history.

(56) References Cited

U.S. PATENT DOCUMENTS 5,964,876 A * 10/1999 Shimomura et al. ............ 726/33
6,073,123 A * 6/2000 Staley ............................ 705/58
6,493,756 B1 * 12/2002 O'Brien et al. ................ 709/224
7,530,117 B2 * 5/2009 Tanaka et al. .................... 726/31
7,647,407 B2 * 1/2010 Omshehe et al. ............. 709/227
8,015,299 B2 * 9/2011 Omshehe et al. ............. 709/227
8,321,352 B1 * 11/2012 Rameshkumar et al. ....... 705/59
2002/0012427 A1 * 1/2002 Rojas ............................ 379/229
2008/0028471 A1 * 1/2008 Chen et al. ...................... 726/27
2008/0235141 A1 * 9/2008 Hilerio et al. .................. 705/59

OTHER PUBLICATIONS

Windows Server 2003 Terminal Server Licensing Technology White Paper Published: May 2003.*
European Search Report and European Office Action for European Application No. EP11181437 dated May 7, 2012.

* cited by examiner

*Primary Examiner* — Saleh Najjar
*Assistant Examiner* — Oleg Korsak
(74) *Attorney, Agent, or Firm* — Patterson Thuente Pedersen, P.A.

(57) ABSTRACT

Apparatus and method for analyzing usage of a software license. A computer system is configured to execute a software product that is activated, subject to a software license, by a first license key. The computer system includes a license use determining module that is adapted to communicate with a group of other computer systems on the same computer network, store first license key-related information that is derived from the first license key, send the first license key-related information to be received by each computer system of the group, and receive any messages sent by responders of the group in response to reception of the first license key-related information. Each of the messages is indicative of a corresponding responder having a copy of the software product that is activated by the first license key.

12 Claims, 9 Drawing Sheets

```
typedef struct _SPC_PACKET {
      USHORT  version;              // Protocol version
      USHORT  type;                 // Packet type
      GUID    RequestID;            // ID of requesting computer
      GUID    ReplyID;              // ID of responding computer
      char    hash[CP_HASH_SIZE];   // Hash
} SPC_PACKET, *SPC_PACKET1;
```

AUTOMATIC ANALYSIS OF SOFTWARE LICENSE USAGE IN A COMPUTER NETWORK

FIELD OF THE INVENTION

The invention relates generally to information systems and associated methods and, more particularly, to enforcement of software licensing provisions.

BACKGROUND OF THE INVENTION

Producers of software products are owners of intellectual property rights to their works. Most often, rather than being sold outright, software is licensed from the software vendor or producer to the customer. The software license agreement governs the rights and obligations of the apparent "seller" and "buyer."

Unscrupulous users of software often use unlicensed copies of the products. As one means of discouraging the practice of using unauthorized copies, developers employ various techniques to limit the functionality of their products in response to a detection of a violation of their intellectual property rights to the software. One approach uses a registration process to associate a license key for a software product with a unique identifier of the computer on which it is installed, or with an instance of registration. Software updates or product support services can then be made contingent upon valid registration of the software product. Each time the software is updated or the subject of support being sought over the Internet, the validity of the license key may be checked prior to providing the update or support.

In the case where the license key is associated with the unique identifier of the computer, the unique identifier may be a computer's MAC address hard-coded into a network interface device of the computer, a hard disk drive serial number, or the like. Checking of the validity of the license key in this case may involve checking whether a known, registered license key is being used by more than one uniquely-identified computer concurrently. Thus, if two or more different uniquely-identified computers seek the same update, this suggests there may be improper use of the software.

In another approach, instances of product registration, and of updates or support services, modify the installed software product in some way, such as by modifying the license key or some other code associated with the product. If a updates or support is sought for a product that has already received similar updates or support, this may indicate unauthorized installation of the software product on more than one machine.

These primitive approaches have a number of drawbacks. Most notably, they are not practical in the context of business, or enterprise, software product customers. In the enterprise context, a company may license large numbers of concurrent users, or seats, of a software product. Enterprises also update their computer hardware more frequently than personal users. Additionally, updates and support for a software product are often handled differently across organizations with some organizations permitting individual users to register and update their copies directly with the software vendor, while others centralize updates and support at their respective information technology (IT) departments. Developing a unified approach to managing software licenses at enterprises is therefore not a simple matter.

In one approach, specialized software tools are offered to system administrators that monitor events in a network environment, including installation of software products, on client computers, for any changes. This approach is generally quite complicated, involving management of massive amounts of data. Similar approaches use specialized administrative tools deployed throughout the computers of the network to monitor software license compliance and report information back to a centralized node about the complete software configurations of each machine. This type of solution is typically a part of a comprehensive administration suite of software. Even if a software vendor desires that its enterprise customers institute a program for ensuring compliance with the terms of the software licenses, there is no practical way for the software vendor to require its customers to undertake the extra expense and complexity of such a comprehensive solution.

In a Web services model, where an application is hosted on one or more servers, one approach that has been proposed for monitoring the license compliance is disclosed in European Patent Pub. No. EP 2112612. In this particular context, web services push down application programs to client machines at their request. When this is done, each application is provided in a particular format with a "response wrapper" that includes a license tag unique to that copy of the program, (such as GUID) and a "broadcast license," which is an encrypted version of the software license key. Search engines, such as Google, request Web applications from application servers. In so doing, the search engines cache response wrappers of the applications as they are returned in response to the search. The search engines can thus be queried for license tags, and results of the query (which include cached response wrappers with broadcast licenses) may be analyzed to determine unauthorized use.

This approach applies in the specific Web services context, and is not applicable in an enterprise context where applications are not pushed on-demand to be executed, but are instead installed locally on individual workstation computers. In the enterprise scenario, there is no cached collection of response wrappers to be readily queried for collection and analysis of license information to ascertain license compliance.

A solution is therefore needed to address these, and other, challenges in automatically determining and addressing software license compliance issues.

SUMMARY OF THE INVENTION

One aspect of the invention is directed to detecting illegal copies of software products in a computer network. Software products may be applications, system software, or middleware. Examples of widely-deployed applications include security applications (like antivirus, firewall, intrusion prevention, etc.), as well as productivity applications (such as word processing, spreadsheet, etc.). One technical effect of this solution is to increase the extent of automation for protection against illegal use of software products.

One aspect of the invention is directed to a computer-implemented apparatus for analyzing usage of a software license that governs permitted usage of a software product. The software product is activated, subject to the software license, by a first license key. The apparatus includes a computer system including a processor circuit operatively coupled with a data storage circuit and a network interface circuit that is adapted to be communicatively coupled to a computer network, and a license use determining module. The license use determining module is adapted to:

communicate, via the network interface circuit, with a group of other computer systems, each computer system of the group being communicatively coupled to the computer network and distinct from the first computer system;

store, in the data storage arrangement, first license key-related information that is derived from the first license key;

send, via the computer network, the first license key-related information, to be received by each computer system of the group;

receive, via the computer network, any messages sent by responders in response to reception of the first license key-related information, each of the responders being a computer system belonging to the group, with each of the messages is indicative of a corresponding responder having a copy of the software product that is activated by the first license key; and collect license key count information that is based on the messages received, and that represents a quantity of any other computer systems of the group which have a copy of the software product activated by the first license key.

In another aspect of the invention, a method for checking compliance with provisions of a software license among a first computer system and a second computer system is provided. The first computer system is configured to execute a software product that is activated, subject to a software license, by a first license key, the first computer system being communicatively coupled to a computer network to which a second computer system is also communicatively coupled. The first computer system receives, over the computer network, a broadcast message sent by the second computer system. The broadcast message includes broadcast license key-related information that is based on a subject license key. The first computer system compares the broadcast license key-related information with local license key information derived from the first license key to produce a comparison result. In response to a comparison result being produced that indicates a match between the local license key-related information and the broadcast license key-related information, the first computer system sends a responsive message that is indicative of the existence of the match.

An exemplary system according to one embodiment includes computers with an installed software product, a computer network, license record(s), cryptographic tools, a module for sending data, a module for receiving data, and a module for determining the extent of concurrent use of the licenses. According to one embodiment, computers on the network which have the software product conduct an information exchange that includes license key-related information. This exchange of information allows creation of a data set, such as a table, identifying relevant software licenses and the number of currently-active antivirus software seats that are associated with each of those licenses.

The computer network that interconnects the computers having the software product facilitates the exchange of information. The computer network may be a local area network, a wide area network, a municipal public access network, etc. The license record is required for full operation of the software product on the computer on which it is installed. The license record contains the license key, and also defines a limit of the number of concurrently working full security applications supported by the license key.

The cryptographic tools present on each computer that has the software product is designed to read the license record and modify data of the license key before transmitting it to the network through the module for sending data utilizing a network interface. The modification to the license key is performed to conceal the actual license key from strangers. The cryptographic tools also facilitate an association between the original license key and the modified license key. This association is provided in one embodiment by hashing such as, for example, MD5, SHA-1, SHA-2, and the like. With the use of a one-way hashing algorithm, the original license key cannot be reconstructed from a hash (i.e., digest) thereof.

The module for sending the data is coupled with the cryptographic tools and, in operation, receives the modified license key, generates a transmission containing the modified license key, and transmits it throughout the computer network. There are several ways in which the transmission may be sent to multiple receiving addresses by the module for sending, including, for example, the use of mailslots, or operating system drivers.

The module for receiving data relating to the license key is operatively coupled with the module for determining the extent of concurrent use of the licenses. In operation, the module for receiving the data receives, over the computer network, license key-related information from other computers on the network which have the software product. Receipt of that information is handled using a mailslot or an operating system driver according to various embodiments.

The module for determining the extent of concurrent use of software licenses accumulates a collection, such as a table, having entries representing each of the license keys received via the module for receiving data over the network, along with a count of each modified license key. In the event that, through operation of the system, it is determined that the use of a license key exceeds the limits of the terms of the license specified in the license record (e.g., that the license key has been used to activate more seats of the software product than permitted by the license), the antivirus application installed locally is passed a message about exceeding the allowable number of licenses used concurrently.

Otherwise, if the number of responses received over the network of computers with the installed software product does not exceed the limits set forth in the license record, the module for determining the extent of concurrent use of licenses updates the collection of license keys to reflect the number of license keys returned in response to the request, and causes the cryptographic tools and the module for sending data to prepare the computer's own modified license key to be sent in response to a future request originated by another computer. Further, where it is determined that the number of responses received does not exceed the limits set forth in the license record, operation of the locally-installed software product is enabled, and the local system is configured to respond to future requests from other computers.

Additionally, the system may include a specialized computer configured with its own module for determining the extent of concurrent use of licenses. The specialized computer further maintains a global license key tracking list, which reflects all the modifications made to the license keys based on the transmissions of the modified license keys throughout the network. The tracking list is of the used license keys is made available a system manager, such as a network administrator, an information systems director of the company, or generally a person responsible for the company's compliance with software license agreements. The tracking list may be made available to the vendor or producer of the security application protected by the software license.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE PREFERRED EMBODIMENTS

Figure 1A:
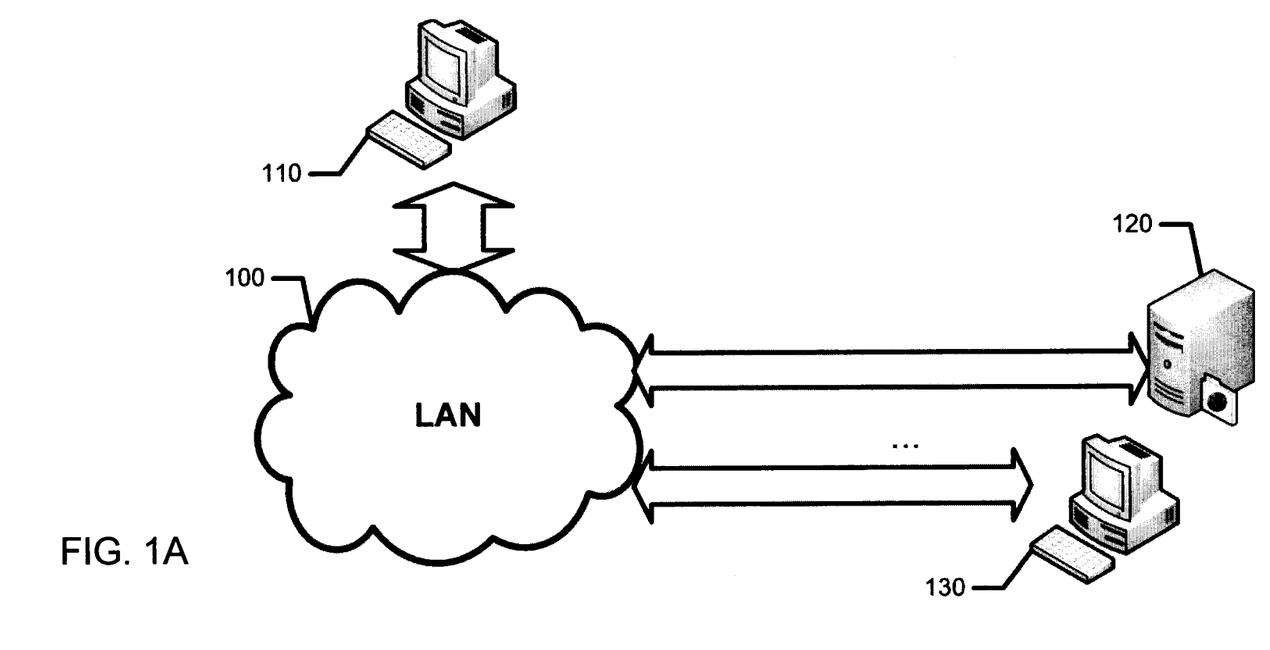
FIG. 1A is a diagram illustrating the general arrangement within a computer network, including various workstation and server computer systems, in which aspects of the invention may be applied.

FIG. 1A illustrates local area network (LAN) 100, which is an example of a typical corporate computer network. LAN 100 includes workstations 110 and 130, and servers 120. A subset of computers (110,120,130) of the local network run a software product under license. The software product can be a security-related (e.g., antivirus, firewall, intrusion prevention, etc.) or a productivity application (e.g., word processor, spreadsheet, etc.).

Figure 1B:
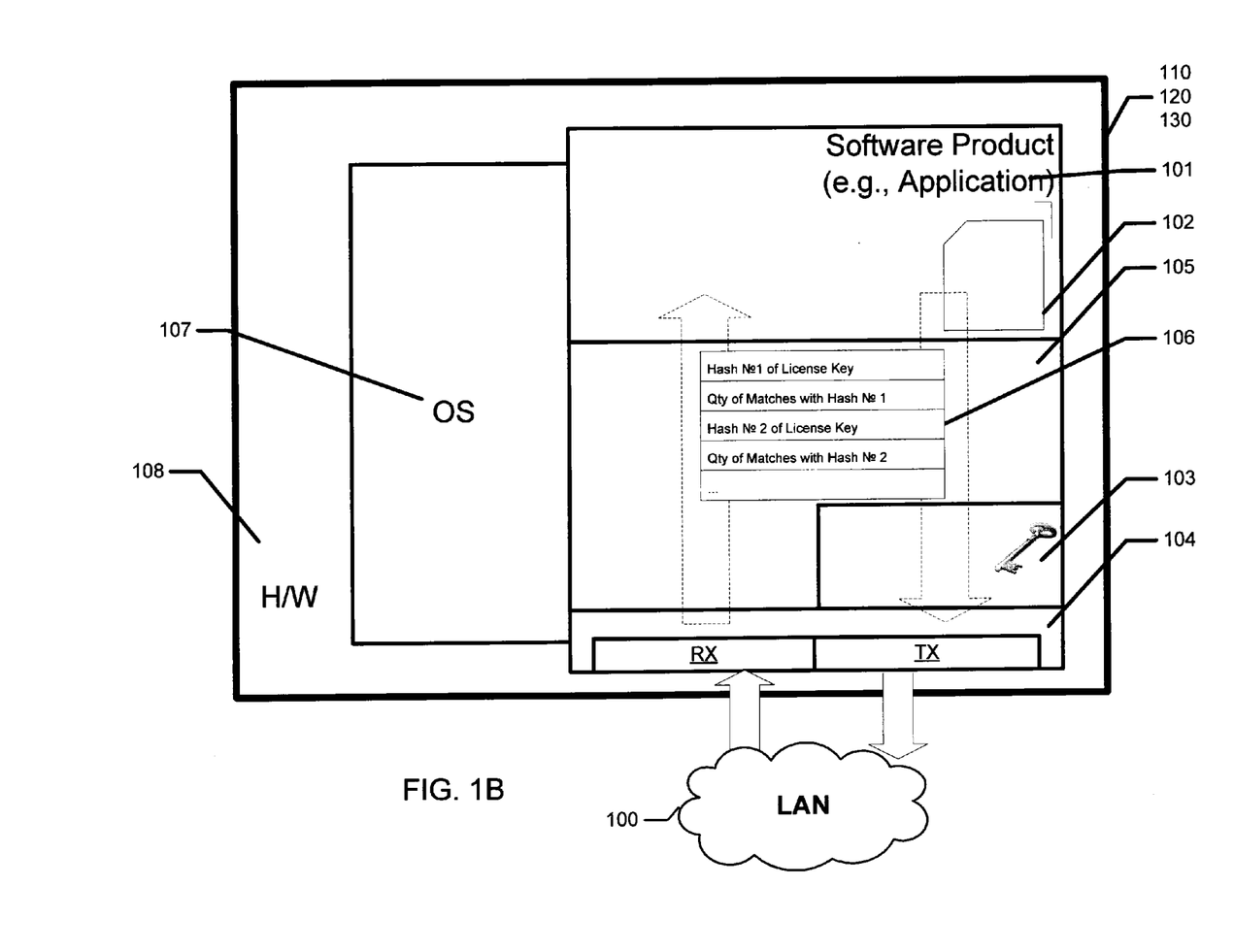
FIG. 1B is a diagram illustrating a configuration for implementing certain embodiments of the invention in the workstation or server computer systems of FIG. 1A.

FIG. 1B is a block diagram illustrating an exemplary configuration of each of computer systems 110, 120, and 130. For software product 101 running on the computer system, the licensee (e.g., user of the software), such as an enterprise, has a license for some determined number of seats of the software product, and has a license record 102 representing that, and other, licensing provisions. In various implementations, license record 102 is incorporated into the configuration data set of software product 101. License record 102 may be stored in the form of a dedicated file in the corresponding computer's file system in association with software product 101; alternatively, license record may be a database record stored as part of a greater data structure.

Computer systems 110, 120, 130 each includes a data sending module TX and a data receiving module RX, which are both part of network interface module 104.

Computer systems 110, 120, and 130 each further includes a license use determining module 105, which maintains a collection of license key-related information about other computers on the network, such as table 106. The software product 101 and the other components operate in conjunction with operating system 107.

The software product 101, cryptographic tools 103, network interface 104, and license use determining module 105 are all are implemented as modules. The term "module" as used herein means a real-world device, component, or arrangement of components implemented using hardware 108, which may include an application specific integrated circuit (ASIC) or field-programmable gate array (FPGA), for example, or a microprocessor system under the control of and a set of instructions to implement the module's functionality, which (while being executed) transform the microprocessor system into a special-purpose device for carrying out the module's functions. A module can also be implemented as a combination of hardware alone and software-controlled hardware, with certain functions facilitated by the hardware alone, and other functions facilitated by a combination of hardware and software. In certain implementations, at least a portion, and in some cases, all, of a module can be executed on the processor(s) of a general purpose computer (such as any of computers 110, 120, 130, which shall be described in greater detail below in connection with FIG. 5) that executes operating system 107, system programs, and application programs (including software product 101), while also implementing the module using multitasking, multithreading, distributed (e.g., cloud) processing, or other such techniques. Accordingly, each module can be realized in a variety of suitable configurations, and should not be limited to any particular implementation exemplified herein.

The licensee and licensor (e.g., the vendor or producer of the software product) have a common interest in enforcing the proper utilization of the software. Clearly, the licensor, wishes to prevent the use of unauthorized copies of its software, which represents lost opportunity for additional revenue. The licensee likewise has an interest in managing its liability by monitoring the proper usage of licensed software products. Automation of license enforcement addresses both of these needs.

Using local network 100, which interconnects all of the computers 110, 130, and servers 120, embodiments of the invention facilitate the task of coordinating and collecting data on the number of installed software products. In one type of embodiment, when software product 101 is started in each computer on which it is installed, that computer initiates a broadcast of requests through the network. These broadcast messages contain information relating to the license key corresponding to the software product. In one example, the license key itself is not broadcast, but rather a modified variant of the license key is sent. The modified variant may be a hash of the license key according to one specific embodiment.

Figure 2A:
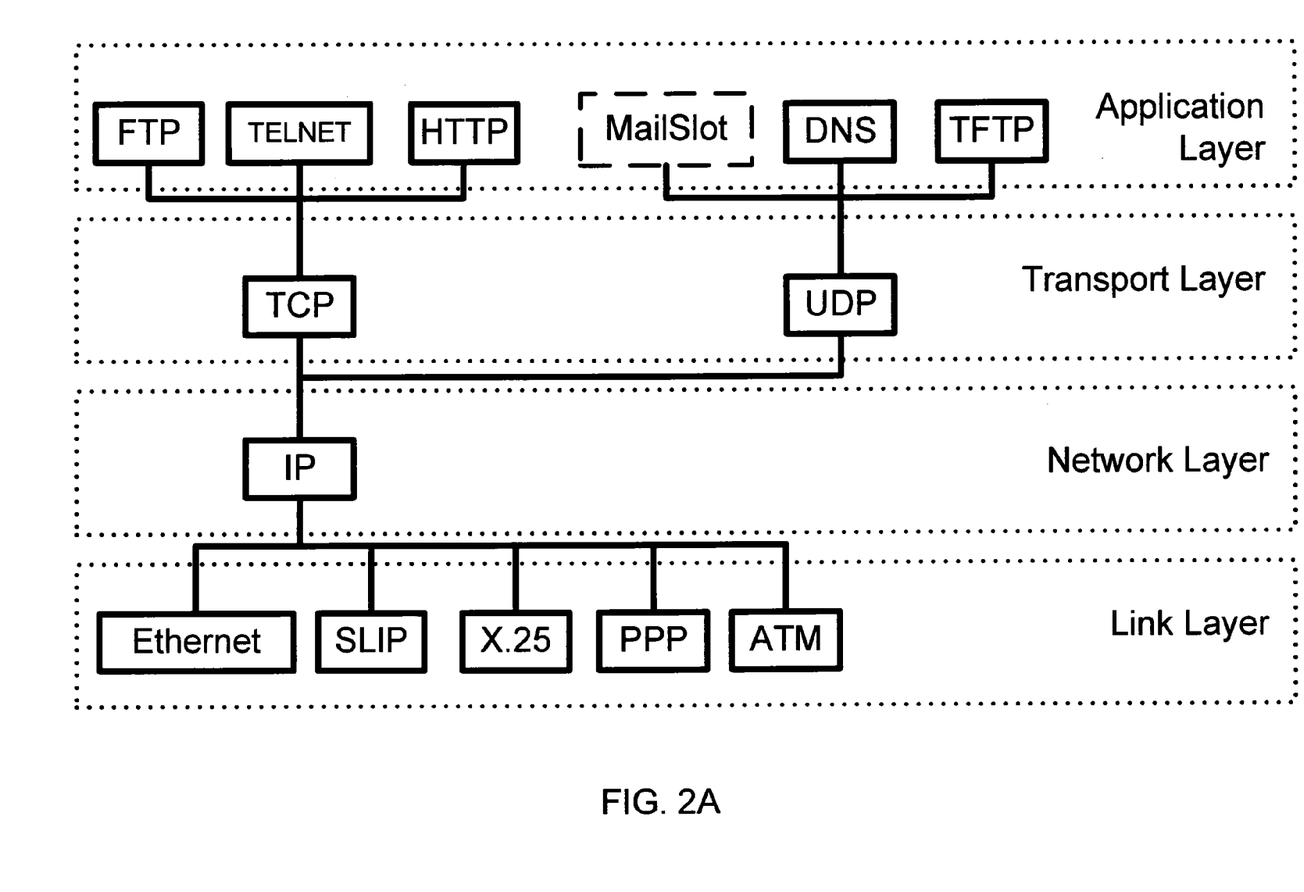
FIG. 2A is a diagram illustrating the TCP/IP stack and the entry point when using mailslot data.

Responses sent by neighboring computers in the local network in response to the request are collected in a collection, such as a list or table 106. This process of collecting responses provides the ability to determine the quantity of currently-running software products activated by the license key. Various approaches may be used according to embodiments of the invention. One such embodiment makes use of mailslot interprocess communication at the application layer, diagrammed in FIG. 2A. In this approach, the sending module TX operates according to the mailslot protocol, which is well-suited for large corporate networks with many subnets. In this model, there is no need to investigate or map out the topology of the network.

Figure 2B:
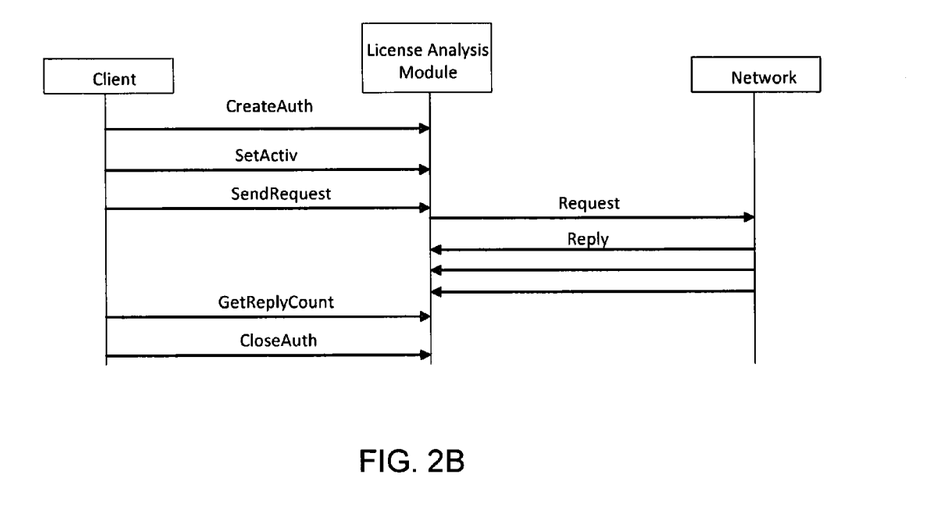
FIG. 2B illustrates information flow relating to the operation of a license analysis module according to one embodiment.
Figure 2C:
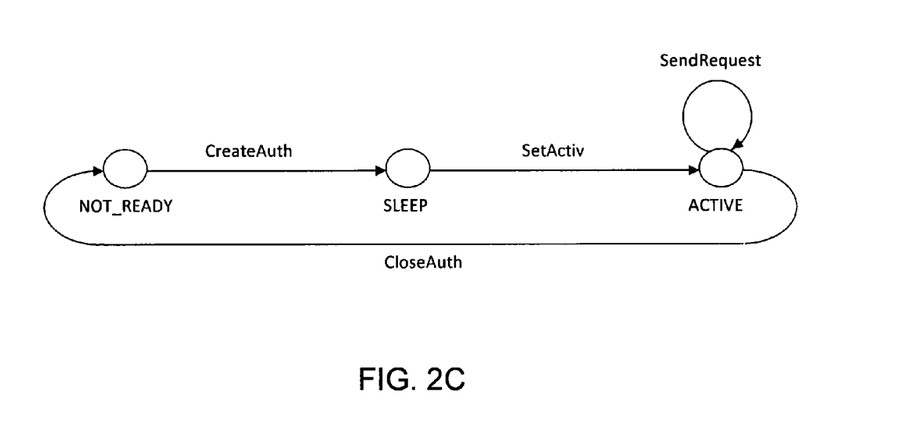
FIG. 2C is a state diagram illustrating the operating states of the license analysis module of FIG. 2B.

In one such embodiment, a system utilizing mailslots as a communication mechanism sends widely-distributed requests, and awaits responses thereto. FIG. 2B illustrates the communication sequence between the local client, the license analysis module, and computers on the local network according to one example. FIG. 2C is a state diagram illustrating an exemplary operation of the license analysis module, which is executed locally on a networked computer system. Initially, the license analysis module is in a NOT_READY state. In order to enable the module to establish mailslot descriptors, a CreateAuth process is initiated, which passes the GUID, license key, and name of a mailslot (not exceeding 30 symbols) to the module. This places the module in the SLEEP state, where the module is configured for operation, but does not accept any incoming packets, and is unable to send any requests. A SetActiv function (with the descriptor obtained through the CreateAuth Process) sets the module into its ACTIVE state.

Figure 2D:
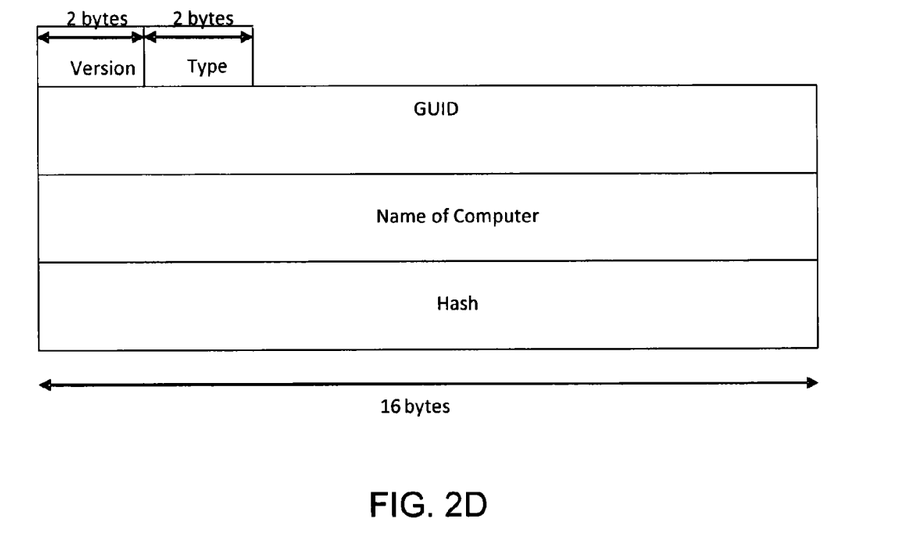
FIG. 2D illustrates an exemplary message format used in exchanging requests and responses according to an embodiment utilizing mailslots.

In the ACTIVE state, the license analysis module creates a mailslot having the name passed to the module in the CreateAuth process. In this state, the module sends requests using the SendRequest function, reads incoming packets, responds to requests from others, and compiles statistical data of responses received to its own requests. Requests are sent using packets of a type KX_TYPE_REQUEST, and responsive packets are of a type KX_TYPE_REPLY. FIG. 2D illustrates the packet format. The packet's fields are defined as follows:
    Version: Indicates the version of the protocol being utilized. Size: 2 bytes.
    Type: Indicates packet type (KX_TYPE_REQUEST or KX_TYPE_REPLY). Size: 2 bytes.
    GUID: Contains the unique identifier of the computer in the network. Size: 16 bytes.
    Name of Computer: Contains the name of the computer which sent the packet. Size: 16 bytes.
    Hash: Contains a hash of the license. Size: 16 bytes.

Upon execution of the SendRequest function, previously-compiled statistics from earlier operation cycles are cleared out, and a message of the type KX_TYPE_REQUEST is widely broadcast to the network, as specified with a ToAll parameter. This broadcast message is thus designed to reach all of the computers on the local network. Alternatively, the request can be formed to apply to only those computers in the local machine's workgroup.

Upon receiving a packet having the type KX_TYPE_REQUEST, the license analysis module compares the hash of the license which is indicated in the packet's payload with its own license hash and, if they are identical, the license analysis module forms a responsive packet of the type KX_TYPE_REPLY, opens the requesting client computer's mailslot descriptor, and writes the responsive packet to the mailslot.

The function GetReplyCount causes the license analysis module to return the quantity of replies received in response to a given request.

To close the operation of the license analysis module, the function CloseAuth is executed, which closes the mailslot descriptor. From this moment, the descriptor which had established the mailslot is no longer valid.

Figure 3A:
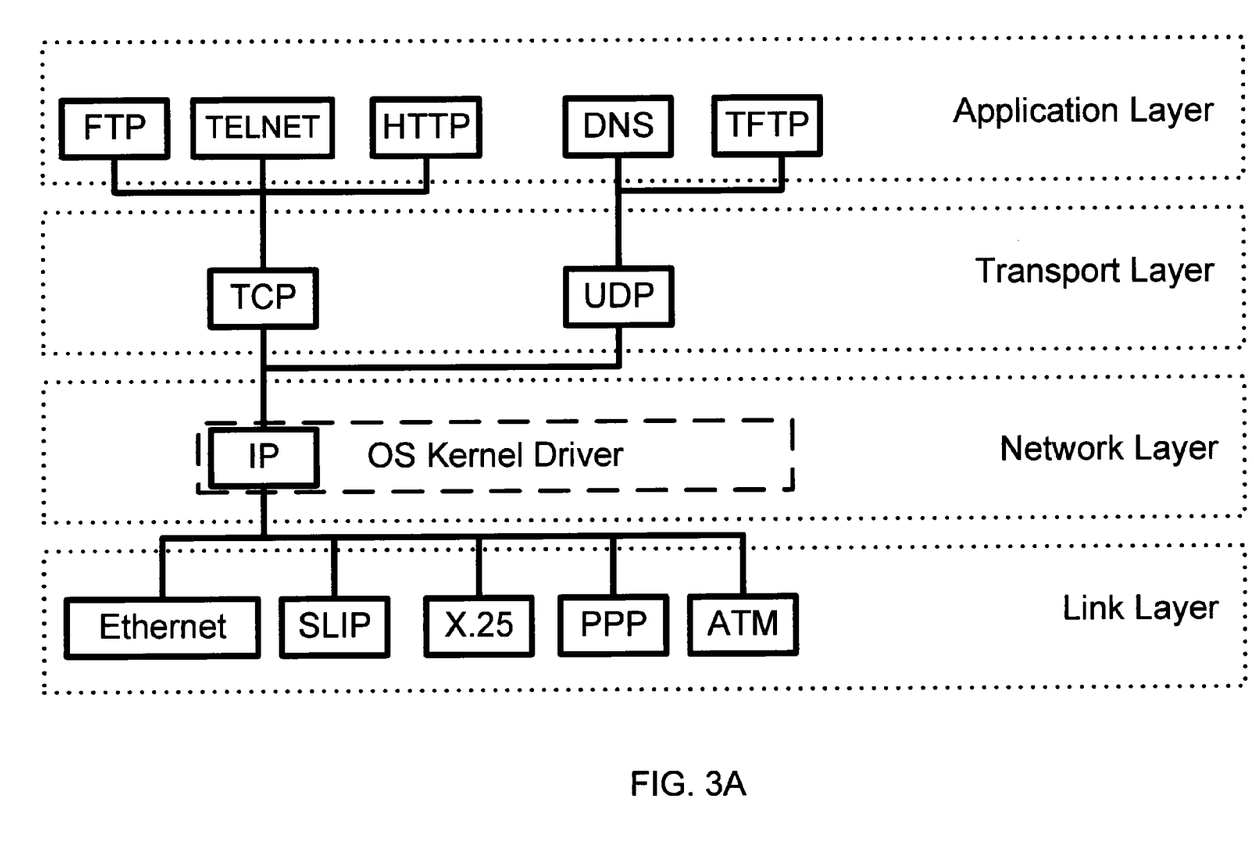
FIG. 3A is a diagram illustrating the TCP/IP stack and the entry point for the transfer of information using OS driver hooks to intercept network packets.

In another embodiment, an operating system (OS) hooking technique is utilized to intercept network packets passed to an OS driver, as diagrammed in FIG. 3. In this technique, the network layer is used as an access means for receiving and transmitting network packets. In one such embodiment, networking driver(s) of the operating system are called upon. In one example, a NDIS filter provides the ability to obtain all packets received and sent by the computer system. A driver interfaces with the NDIS filter and facilitates sending and receiving packets via NDIS. In one particular example utilizing a Microsoft Windows platform, the driver is implemented as a combination of the KL1 driver, and a specialized plugin that adds custom functionality thereto.

Figure 3B:
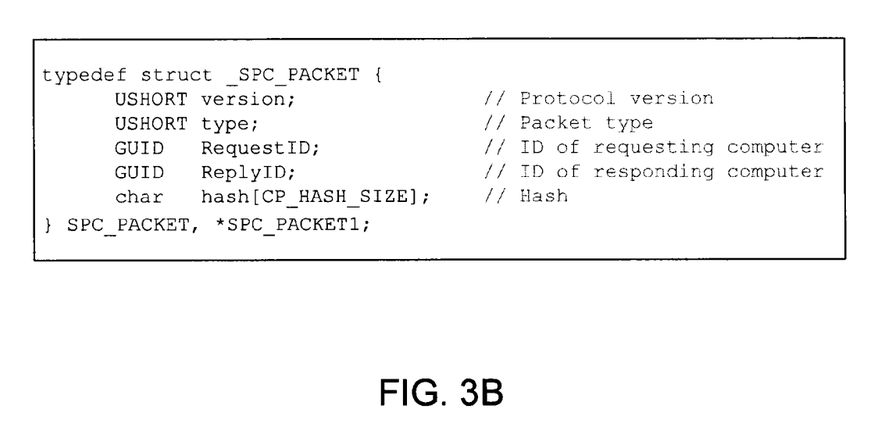
FIG. 3B presents software code defining a specialized packet for exchanging requests and responses according to one type of embodiment.

In one embodiment, a specialized protocol based on the Internet protocol (IP) is utilized. A data frame that includes the specialize packet may be composed of an Ethernet header portion, followed by an IP header portion, which in turn is followed by the specialized packet. The specialized packet may be defined as exemplified in FIG. 3B. The specialized packet's fields are defined as follows:
    Version: indicates the version of the protocol being used
        Type: identifies the packet type (PCP_REQUEST_PACKET, PCP_ANSWER_PACKET . . . )
        RequestID: ID of the client that executes checking of the license over the network
        ReplyID: ID of the client that responds to the request
        Hash: 16-byte size. Contains a hash of the operation.
A specialized packet for sending a request may be arranged as follows:
    Ethernet Header
    Src MAC=MacAddr local host
    Dst MAC=FF.FF.FF.FF.FF.FF
    IP Header
    Src IP=local host's IP address
    Dst IP=FF.FF.FF.FF
    Protocol=PROTO1
    TTL=255
    Specialized Packet
    Version=Current version identifier of the specialized packet
    Type=SPC_REQUEST_PACKET
    RequestID=ID of the client (Established at initialization)
    ReplyID=Padded with zeros
    Hash=Contains a hash of the license key
One example of a response specialized packet is as follows:
    Ethernet Header
    Src MAC=MacAddress of the local host
    Dst MAC=FF.FF.FF.FF.FF.FF
    IP Header
    Src IP=IP address of the local host
    Dst IP=FF.FF.FF.FF
    Protocol=PROTO_SPC
    TTL=255
    Specialized Packet
    Version=Current version identifier of the specialized packet
    Type=PCP_ANSWER_PACKET
    RequestID=ID taken from the request packet
    ReplyID=ID of the responsive computer (Established at initialization).
    Hash=Contains a hash computed based on the license key and on the ID of the client.

Use of certain existing facilities of the operating system can reduce latency time and increase the speed of the system. In addition, this approach enjoys a high reliability of data delivery, since the work of the driver of the operating system is protected by additional security of the operating system. One advantage of the OS driver-interceptor hooking technique lies in the fact that the protocol implementation resides at the kernel and is therefore less susceptible to malicious interference than the mailslot. Other mechanisms for sending the broadcast massage, such as named pipes, or windows sockets, or any collection of functions available in Win API, for instance, can also be employed. However, it should be noted that the invention is not limited to any particular implementation, and that any suitable messaging or transport mechanism may be utilized to send and receive request and response messages.

Computer system 110 is programmed to operate according to the following process according to one embodiment. After the software product 101 is installed on computer system 110, the associated license key is activated, which establishes license record 102 that is associated with the activated software product 101. The license record 102 contains the maximum allowed concurrently-activated software products 101 activated by the particular license key, and license key itself.

Once software product 101 becomes activated on computer system 110, license use determining module 105, using cryptographic tools 103, modifies, or obfuscates, the license key. A modification of the license key is achieved in one type of embodiment by applying a cryptographic hash function to the license key. Examples of hash functions include MD5, SHA-1, SHA-2, and the like. Other presently-known or after-arising techniques for obfuscating the original license key and its modification may also be utilized. The modified license key is stored in a collection such as table 106, for instance.

Based on the modified or otherwise obfuscated license key, computer system 110 generates and transmits a widely-distributed message broadcast to the other computers on network 100, such as server 120, or workstation computer system 130, via sending module TX of network interface device 104. In one particular embodiment, the broadcast message includes a modified version (e.g., hash) of the license key. In another embodiment, although a modified license key is not included in the message itself, the message nevertheless informs the other computers on how or where to obtain the modified license key, which may be stored at a specific location and available for retrieval by the computers on the network. In either approach, broadcast message permits its recipient to obtain license key-related information that is based on, or derived from, the specific license key itself.

The computers receiving the broadcast message, which in this example are server 120 and workstation computer system 130, pass the license key-related information to license use determining module 105. It should be noted that each computer system 110, 120, 130 can act as a sender of broadcast messages, and a receiver of broadcast messages; thus, it will be understood that the current example presented in which computer system 110 is the sender and computer systems 120 and 130 are the receivers of license key-related messages is applicable to the case where any one or more of the computers takes either role.

After receiving a broadcast message through its receiving module RX of network interface 104, each receiving computer system 120, 130 passes the license key-related message to its respective license use determining module 105. Each respective license use determining module 105 compares the received license key-related information with its own (local) license key-related information corresponding to the software product 101 that is installed on the computer system, which may be stored in table 106 according to one embodiment. If there is no match, it means that the computer system which sent the message uses a different license key, and therefore the sending computer system 110 and receiving computer system 120 or 130 cannot possibly combine in a way that would violate either one's software license relating to software product 101.

If, on the other hand, a match of received and local license key-related information is determined by the license use determining module of the receiving computer system 120 or 130, then the receiving computer, via its sending module TX, sends a response to the sender computer system 110 with a flag indicating the match of license keys. In various embodiments, the responsive message has differing amounts of information content. For example, the responsive message may simply indicate that it relates to a license key inquiry. In this case, the very existence of the message (close in time to the broadcast message) is indicative of there having been detected a match of modified license keys. In another example, the broadcast message includes a timestamp or other instance code, and the responsive message includes a copy of that same instance code (or a modified version of the instance code, e.g., digitally signed using a private key of the receiving computer system). This way, the broadcast message-originating computer system (system 101 in this example) can associate the responsive message with the broadcast message with greater certainty). The instance code may be the hash of the license key which is included in the broadcast message, or some other value.

The responsive message may also include an identifier of the computer system sending the responsive message, information about the software product installed on the computer, and other pertinent information. The responsive message can be sent using a mailslot, or using the OS kernel driver used in sending the broadcast message; or, alternatively, may use a different channel or protocol for transmission such as, for example, a named pipe, or windows socket. In the case where the broadcast message was sent using a mailslot, one advantage of sending the responsive message using a different protocol is that the responsive message can be addressed specifically to the computer system that sent the original request, and may be transported more reliably.

The responsive transmission, when received by receiving module RX of computer system 110, is passed to license use determining module 105 of that computer system. If determining module 105 determines that the responsive transmission has the flag asserted (indicating a match of modified license keys) from another computer on the network 120 or 130, license use determining module 105 increments the count of how many matches have been identified for the modified license key in table 106. The count is then compared against a predetermined limit, which is based on the license record of the activated software product 101. If the count does not exceed the limit, software product 101 running on computer system 110 is permitted to operate normally.

If the count of matches exceeds the limit, number of active licenses, the functionality of software product 101 may be automatically limited. In one example, software product 101 is modified to no longer able to be operable with the license key and license record 102. In another example, the software product 101 is modified such that it can no longer receive updates from the software manufacturer. In yet another example, software product 101 is modified to revert to a trial version, which notifies the user that the trial period will expire after a period of time unless the software product is activated with a new valid license.

In a related aspect of the invention, a system for generating a complete list of the used license keys for a particular software product in a local network is provided. In various embodiments, a specialized deployed license information collection system is structured like any one of workstation or server computer systems 110, 120, and 130 described above, except that the deployed license information collection system may or may not reside on a computer system that also has software product 101, license record 102, or cryptographic tools 103.

Another possible difference of the license information collection system from the workstation or server systems is in the operation of license use determining module 105. In the workstation or server computer systems 110, 120, and 130, the objective of the license use determining module 105 can be regarded as primarily discovering the extent of use, in other machines, of the license key used to activate the software product of the present computer. Conversely, the license use determining module 105 of the license information collection system is concerned with the wider goal of collecting license use information for all instances of the software product in the network.

Accordingly, in one implementation, the license information collection system is configured to monitor messages broadcast by computer systems 110, 120, and 130 as part of the protocol described above in which license keys are accounted for. Received messages having modified license keys are stored and tabulated in a collection managed by license use determining module 105 of the license information collection system. Thus, the quantity of each modified license key may be ascertained.

In a related implementation, the license information collection system originates broadcasts of requests using modified license keys stored in the collection. This operating regime is similar to that of workstation or server computer systems 110, 120, or 130 described above, except that the license information collection system originates requests corresponding to multiple different license keys that are stored in, counted, and added to, the collection maintained by license use determining module 105 of the license information collection system over time.

The collection is made available to system administrators, or possibly the software vendor. In cases where the number of working copies of the software product under a certain license exceeds the limit defined in the corresponding license record, action may be taken in the form of issuing reports, alerts, and the like. In other embodiments, the license information collection system issues a command directed to certain computer systems, or to certain groups of computer systems, to disable, de-feature, or otherwise limit the operation of the software product believed to be used in violation of the license terms.

Figure 4:
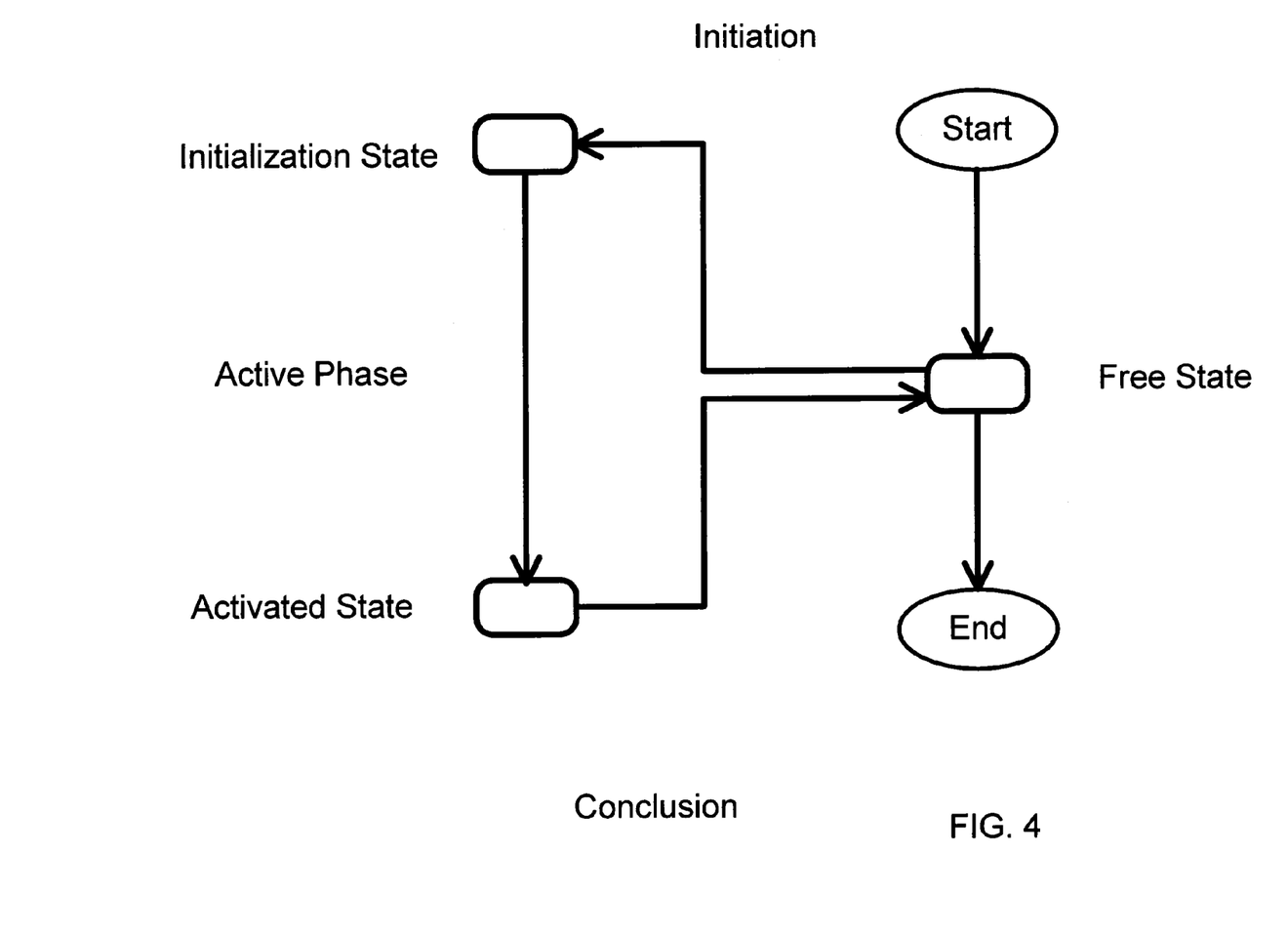
FIG. 4 is a diagram illustrating operational states of a computer system carrying out a process according to certain embodiments of the invention.

An example process of the operation of license use determining module 105 is illustrated in the state diagram of FIG. 4. In the free state, no messages are sent or received. This uninitialized state is entered into immediately after loading the driver for license use determining module 105. The initialization state is entered when the license use determining module 105 is started up. Once initialized, the license use determining module 105 responds to received requests, but does not send requests and does not analyze the responses to the requests.

The Activated state is entered into based on various triggering events. In one case, the activated state is entered in response to certain events, such as activation of the software product with a license key, or each time when the software product is started up or updated. In another example, the activated state is entered based on a schedule, or periodically at some predetermined interval. In the activated state, the computer system originates and sends requests to the network, and receives responses thereto. In addition, the license use determining module 105 continues to respond to remotely-originated requests. The computer system maintains the collection of remote machines that have responded close in time following each request.

In response to a command to de-initialize, the license use determining module 105 returns to its free state, which does not send or accept any requests or responses.

Figure 5:
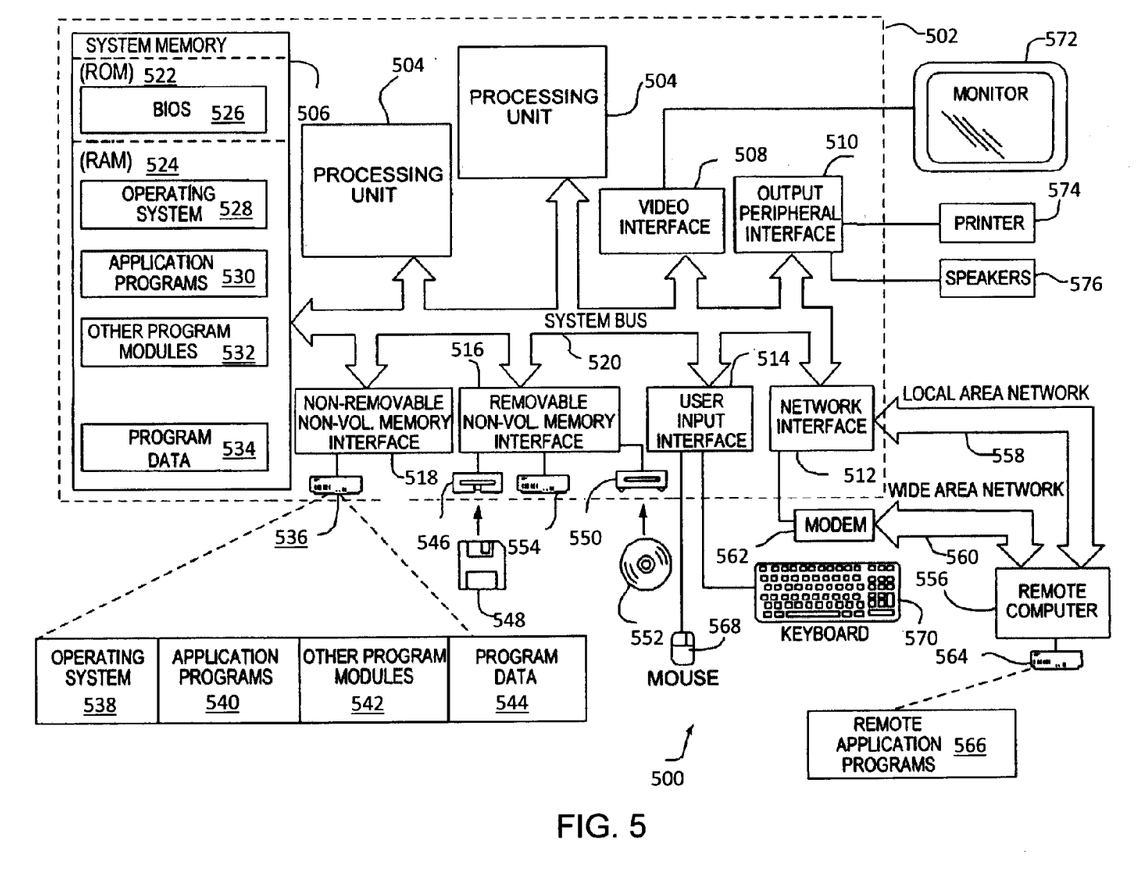
FIG. 5 shows a sample computer system for general-purpose personal computer or server.

FIG. 5 is a diagram illustrating an example of general-purpose computer system 500 on which aspects of the invention as described herein may be implemented according to various embodiments. The computer system 500 may include a computing device such as a personal computer 502. The personal computer 502 includes one or more processing units 504, a system memory 506, a video interface 508, an output peripheral interface 510, a network interface 512, a user input interface 514, removable 516 and non-removable 518 memory interfaces and a system bus or high-speed communications channel 520 coupling the various components. In various embodiments, the processing units 504 may have multiple logical cores that are able to process information stored on computer readable media such as the system memory 506 or memory attached to the removable 516 and non-removable 518 memory interfaces 518. The computer 502 system memory 506 may include non-volatile memory such as Read Only Memory (ROM) 522 or volatile memory such as Random Access Memory (RAM) 524. The ROM 522 may include a basic input/output system (BIOS) 526 to help communicate with the other portion of the computer 502. The RAM 524 may store portions of various software products such as the operating system 528, application programs 530 and other program modules 532. Further, the RAM 524 may store other information such as program or application data 534. In various embodiments, the RAM 524 stores information that requires low-latencies and efficient access, such as programs and data being manipulated or operated on. In various embodiments RAM 524 comprises Double Data Rate (DDR) memory, Error Correcting memory (ECC) or other memory technologies with varying latencies and configurations such as RAMBUS or DDR2 and DDR3. In this way, in various embodiments, the system memory 506 may store the input data store, access credential data store, operating memory data store, instruction set data store, analysis result data store and the operating memory data store. Further, in various embodiments, the processing units 504 may be configured to execute instructions that limit access to the aforementioned data stores by requiring access credential before access to the information is granted.

The removable 516 and non-removable 518 memory interfaces may couple the computer 502 to disk drives 536 such as security serverD or rotational disk drives. These disk drives 536 may provide further storage for various software products such as the operating system 538, application programs 540 and other program modules 542. Further, the disk drives 536 may store other information such as program or application data 544. In various embodiments, the disk drives 536 store information that doesn't require the same low-latencies as in other storage mediums. Further, the operating system 538, application program 540 data, program modules 542 and program or application data 544 may be the same information as that stored in the RAM 524 in various embodiments mentioned above or it may be different data potentially derivative of the RAM 524 stored data.

Further, the removable non-volatile memory interface 516 may couple the computer 502 to magnetic portable disk drives 546 that utilize magnetic media such as the floppy disk 548, Iomega® Zip or Jazz, or optical disk drives 550 that utilize optical media 552 for storage of computer readable media such as Blu-Ray®, DVD-R/RW, CD-R/RW and other similar formats. Still other embodiments utilize security serverD or rotational disks housed in portable enclosures to increase the capacity of removable memory.

The computer 502 may utilize the network interface 512 to communicate with one or more remote computers 556 over a local area network (LAN) 558 or a wide area network (WAN) 560. The network interface 512 may utilize a Network Interface Card (NIC) or other interface such as a modem 562 to enable communication. The modem 562 may enable communication over telephone lines, coaxial, fiber optic, powerline, or wirelessly. The remote computer 556 may contain a similar hardware and software configuration or may have a memory 564 that contains remote application programs 566 that may provide additional computer readable instructions to the computer 502. In various embodiments, the remote computer memory 564 can be utilized to store information such as identified file information that may be later downloaded to local system memory 506. Further, in various embodiments the remote computer 556 may be an application server, an administrative server, client computers, or a network appliance.

A user may enter information to the computer 502 using input devices connected to the user input interface 514 such as a mouse 568 and keyboard 570. Additionally, the input device may be a trackpad, fingerprint scanner, joystick, barcode scanner, media scanner or the like. The video interface 508 may provide visual information to a display such as a monitor 572. The video interface 508 may be an embedded interface or it may be a discrete interface. Further, the computer may utilize a plurality of video interfaces 508, network interfaces 512 and removable 516 and non-removable 518 interfaces in order to increase the flexibility in operation of the computer 502. Further, various embodiments utilize several monitors 572 and several video interfaces 508 to vary the performance and capabilities of the computer 502. Other computer interfaces may be included in computer 502 such as the output peripheral interface 510. This interface may be coupled to a printer 574 or speakers 576 or other peripherals to provide additional functionality to the computer 502.

Various alternative configurations and implementations of the computer 502 are contemplated for various embodiments of the invention. These variations may include, without limitation, additional interfaces coupled to the system bus 520 such as universal serial bus (USB), printer port, game port, PCI bus, PCI Express or integrations of the various components described above into chipset components such as the northbridge or southbridge. For example, in various embodiments, the processing unit 504 may include an embedded memory controller (not shown) to enable more efficient transfer of data from the system memory 506 than the system bus 520 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A computer-implemented apparatus for collecting license usage information of software licenses that govern permitted usage of software product deployed on a plurality of distinct computer workstations, the software product being activated on different ones of the plurality of computer workstations, subject to the software licenses, by corresponding license keys, and wherein the plurality of computer workstations exchange license key-related information according to a protocol in which each of the computer workstations responds to an initial broadcast, sent by any one of the computer workstations, of a code derived from a license key with which that computer workstation has a matching license key, the response including broadcasting a responsive message indicating the match;
the apparatus comprising:
a computer system including a processor circuit operatively coupled with a data storage circuit and a network interface circuit that is adapted to be communicatively coupled to a computer network;
wherein the computer system includes a license use determining module that is adapted to:
monitor, via the network interface circuit, transmissions of responsive messages, each of which includes a responsive message sent by a corresponding computer workstation that has the mathing license key;
store, in the data storage circuit, a collection of license key-related information corresponding to a plurality of different license keys based on received transmissions of the responsive messages; and
ascertain license key count information based on the collection of license key-related information that represents a quantity of computer workstations which have a copy of the software product activated by a corresponding license key; and
wherein the license use determining module is further configured to monitor the transmissions of responsive messages that are sent in response to an initial broadcast that is sent by a computer workstation that is distinct from the apparatus comprising the license use determining module.

2. The apparatus of claim 1, wherein the data storage circuit stores a license record that defines at least one limit to usage of the software product, including a limit of a quantity of distinct computer systems on which the software product may be activated by the corresponding license key; and
wherein the license use determining module is adapted to compare the license key count information against the limit to produce an indication of whether the limit is exceeded.

3. The apparatus of claim 2, wherein the license use determining module is adapted to send a command to limit usability of the software product in response to an indication that the limit is exceeded.

4. The apparatus of claim 2, wherein the license use determining module is adapted to issue a notification to a user interface in response to an indication that the limit is exceeded.

5. The apparatus of claim 1, wherein the software product is a security application.

6. The apparatus of claim 1, wherein the computer system is configured to execute, via at least the processor circuit and the data storage circuit, the software product.

7. The apparatus of claim 1, wherein the license key-related information includes a cryptographic modification of each corresponding license key.

8. The apparatus of claim 7, wherein the license key-related information includes a one-way hash of each license key.

9. The apparatus of claim 1, wherein the computer workstations are adapted to exchange the license key-related information via mailslot interprocess communication.

10. The apparatus of claim 1, wherein each of the computer workstations includes an operating system, and wherein each computer workstation is configured to send the license key-related information via a driver of the operating system that utilizes TCP, and that operates at the network layer of the TCP stack.

11. A method for monitoring usage of software product on a plurality of distinct computer workstations, the software product being activated on different ones of the plurality of computer workstations, subject to software licensing, by corresponding license keys, and wherein the plurality of computer workstations exchange license key-related information according to a protocol in which each of the computer workstations responds to an initial broadcast, sent by one of the computer workstations, of a code derived from a license key with which that computer workstation has a matching license key, the response including broadcasting a responsive message indicating the match; the method comprising:

monitoring, by a license information collection system, responsive messages being sent, including responsive messages that are sent in response to an initial broadcast that is sent by a computer workstation that is distinct from the license information collection system;

storing, by a license information collection system, a collection of license key-related information corresponding to a plurality of different license keys based on the responsive messages; and determining, based on the collection of license key-related information, whether a number of working copies of the software product exceeds a limit.

12. The method of claim 11, further comprising:

originating, by the license information collection system, a plurality of initial broadcasts of codes derived from different license keys.

\* \* \* \* \*